United States Patent [19]
Collins

[11] 3,721,034
[45] March 20, 1973

[54] FISH HOOK REMOVER

[76] Inventor: Paul R. Collins, 6065 Wing Lake Rd., Birmingham, Mich. 48010

[22] Filed: Sept. 13, 1971

[21] Appl. No.: 179,656

[52] U.S. Cl. ............................................. 43/53.5
[51] Int. Cl. ............................................. A01k 97/00
[58] Field of Search ................................. 43/53.5

[56] References Cited

UNITED STATES PATENTS

| | | | |
|---|---|---|---|
| 2,294,758 | 9/1942 | Manske | 43/53.5 |
| 2,797,523 | 7/1957 | Dillard | 43/53.5 |
| 2,892,284 | 6/1959 | Shawhan | 43/53.5 |

Primary Examiner—Louis G. Mancene
Assistant Examiner—Daniel J. Leach
Attorney—J. King Harness et al.

[57] ABSTRACT

A fish hook remover device comprising a two-piece assembly including an L-shaped tubular member and an elongated, resilient wire member. The wire member is bent intermediate its ends to form a large U-shaped portion with one end thereof engaged with an end of the tubular member which forms a handle and with its other end having a smaller U-shaped portion thereon slidable within the other end of the tubular member. The large U-shaped portion acts as a spring for biasing the smaller U-shaped portion out of the end of the tubular member. To remove a hook from the mouth of a fish, the hook is positioned within the smaller U-shaped portion, the handle is squeezed, and the smaller U-shaped portion is brought into contact with the hook to provide camming and cutting actions to free the hook from the fish's mouth.

5 Claims, 6 Drawing Figures

PATENTED MAR 20 1973
3,721,034
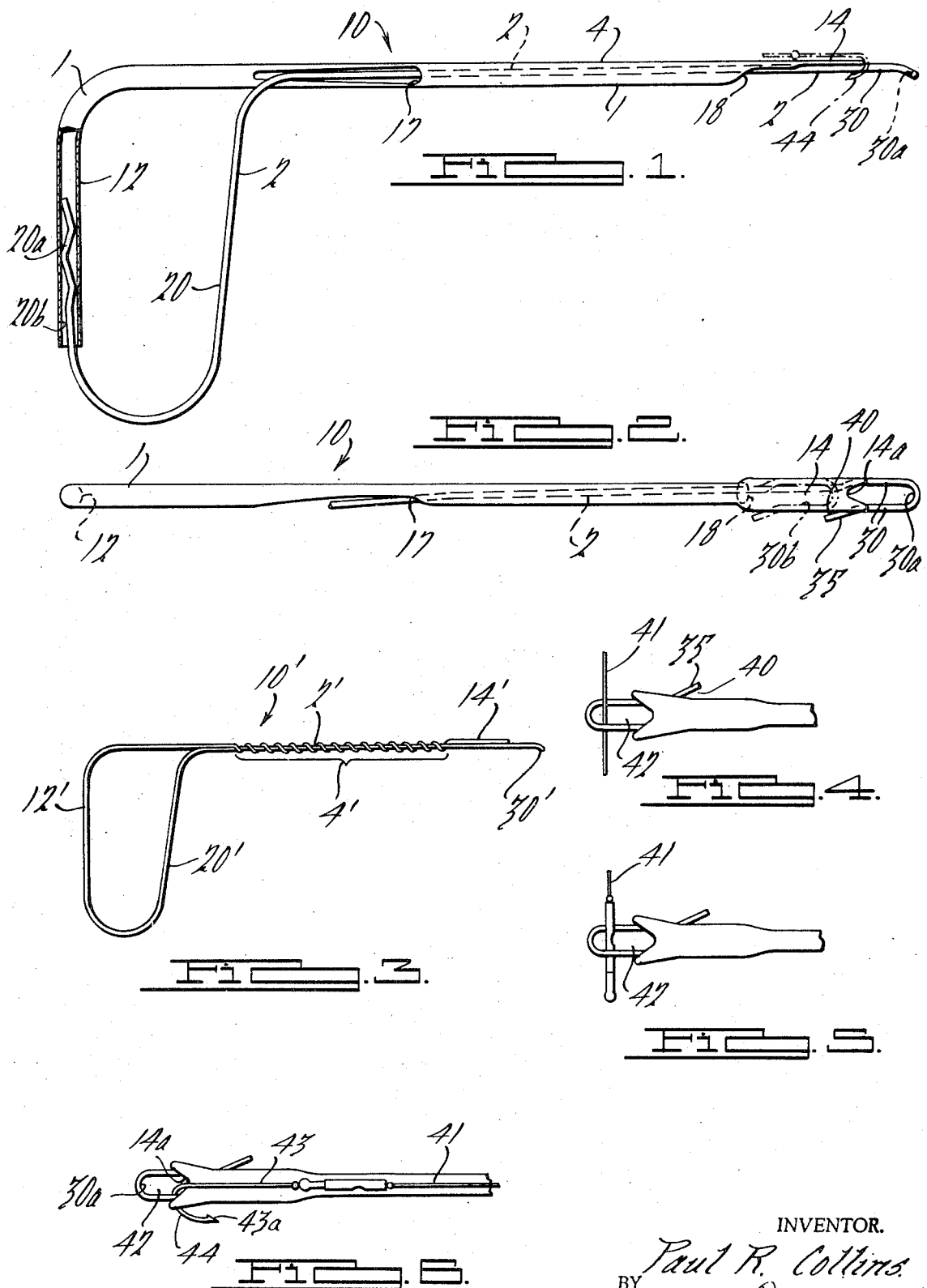
INVENTOR.
Paul R. Collins
BY Harness, Dickey & Pierce
ATTORNEYS

FISH HOOK REMOVER

BACKGROUND OF THE INVENTION

This invention broadly relates to an improved fish hook remover. The state of the prior art is indicated by Shawhan, U. S. Pat. No. 2,892,284.

A primary object of this invention is to provide an improved fish hook remover.

Another object of the present invention is to provide an improved fish hook remover which is uniquely and simply constructed such that it can be manufactured very economically.

Another object of the present invention is to provide an improved fish hook remover which is made in a new two-part construction.

Another object of the present invention is to provide an improved fish hook remover device which is safe and easy to use, and which can be made of various materials such as various metal and/or plastic materials.

Other objects, features, and advantages of the present invention will become apparent from the subsequent description and the appended claims taken in conjunction with the accompanying drawings, wherein like numerals in different drawing figures indicate like elements.

BRIEF DESCRIPTION OF THE DRAWINGS

FIG. 1 illustrates a plan view of the fish hook remover of this invention;

FIG. 2 illustrates a top view of FIG. 1 with a portion of the wire member not shown;

FIG. 3 illustrates another embodiment of the invention;

FIGS. 4, 5, and 6 illustrate sequence usage of the device herein.

SUMMARY OF THE INVENTION

Briefly stated, the present invention concerns a fish hook remover, which I have termed a Saf-DeHooker, comprising generally a single or a two-piece assembly, including an L-shaped tubular member, a handle means at and formed by the lower end of the L-shaped member, a fork means at the other end of the L-shaped member, an elongated wire member, a large U-shaped means at one end of the wire member with one side of the U-shaped means being lodged inside the end of the tubular handle means, a smaller U-shaped means at the other end of the wire member to serve as a guide which follows down the fishing line to the hook, with part of the wire between said two U-shaped means extending through said tubular member, said smaller U-shaped means being slidably arranged relative to said fork means to reduce the area defined within the fork when the two are slidably moved together, said large U-shaped means being operative to act as a spring for biasing the smaller U-shaped means back to a normal set position in between uses of the fish hook remover.

DESCRIPTION OF PREFERRED EMBODIMENTS

FIGS. 1 and 2 illustrate a suitable embodiment of the invention herein comprising a fish hook remover designated 10 which is made up of a two-piece assembly including an L-shaped tubular member 1 and an elongated wire member 2. The L-shaped member 1 is generally comprised of a handle means 12 formed at the lower end of the L-shaped member and a fork means 14 formed at the other end of the L-shaped member 1. Members 1 and 2 can be made of similar or dissimilar metals or plastics or any combination thereof to make a complete unit herein comprising a fish hook remover designated 10. The elongated wire member 2 is shaped such that there is a large U-shaped means designated 20 at the left end of the wire member as shown in FIG. 1 and a smaller U-shaped means 30 at the other end of the wire member 2, as best shown in the top view illustration of FIG. 2.

The L-shaped tubular member 1 is adapted to receive a crimped end portion 20a of the wire member 2 such that the crimped end portion 20a is tightly lodged within the tubular member 1 by forcing the crimped end 20a up inside the aperture 20b of the L-shaped tubular member 1.

The member 2 is formed of any suitable material such as for example a fairly stiff spring metal or plastic. As shown the member 2 extends through an aperture 17 in the tubular member 1 and the member 2 then runs through the center part of the tubular member until it passes out another aperture 18.

Operation and usage of the fish hook remover 10 is as follows.

The handle means 12 is grasped with the hand such that the fingers are extended around the other side of the larger U-shaped portion 20 so that the U-shaped wire 20 is ready to be squeezed together by the hand. Squeezing of the U-shaped wire portion 20 causes the end 30a of the U-shaped member 30 to be pulled inwardly in a direction (see secondary position shown in phantom designated 30b) toward the point 14a of the fork member 14. When the hand squeezing action is released, the U-shaped wire portion 20 acts as a spring for biasing the smaller U-shaped member 30 back to its normal set position as shown best in the view of FIG. 2.

To remove a hook from the fish mouth the extended end portion 35 of the smaller U-shaped member 30 is used to catch the fish line or leader 41 within the area 40 such that the fish line or leader is brought within the area 42 of the smaller U-shaped member 30, as best seen in FIGS. 4, 5, and 6. With the fish line or leader 41 enclosed within the area 42 the fish hook remover is then lowered down the line until it is snug against the end of the fish hook 43 as shown in FIG. 6. This action is all carried out without holding or touching the fish itself and when the fish hook remover device 10 is positioned as shown in FIG. 6 then the U-shaped wire member 20 positioned adjacent the handle 12 is squeezed such that the end 30a of the smaller U-shaped member 30 is brought snugly up against the hook 43 and when the end portion 30a is brought into contact with the curved surface 44 (see FIG. 6) of the hook 43 the end 30a exhibits a camming action against surface 44, thus the pressure exerted on the barb 43a of the hook exerts a cutting action which results in removing or extracting the fish hook from its lodged position within the fish. The camming or cutting action is carried out by the pressure exerted by the portion 30a against the curved surface 44 of the fish hook (see FIGS. 1 and 6). See particularly the view of FIG. 1 which illustrates that portion 30a generally contacts the surface 44 generally closely adjacent to the hook barb 43a. Thus when the hook 43 is brought snug against the Y tip member 14 of the barrel 4 of the fish hook remover, the squeezing action exerted on the handle 12 and wire member 20 operates to let the fish drop off.

For fishing plugs, which for example may utilize gang or treble hooks, the guide member or end portion 35 is inserted under the hook caught in the fish's mouth and then the hook is held snugly against the Y tip 14 of the barrel 4 and the handle is squeezed firmly to let the fish drop off the hook.

FIG. 3 shows an alternative embodiment of the invention, which operates in the same general manner as above, wherein the device 10' is of one piece (metal or plastic) construction and the barrel portion 4' is formed by extending the wire from the left side of U-shaped member 20' up around the wire portion 2' in helical fashion to form the barrel portion 4' and then extending further in a final flattened out portion forming the Y tip or fork means 14'.

ADVANTAGES OF THE INVENTION

The advantages of this invention should be fairly apparent from the disclosure set forth above. Particularly, the device of this invention is considerably more advantageous in comparison with prior art devices such as that of U.S. Pat. No. 2,892,284. These prior art devices were of multi-piece construction and were difficult and uneconomical to manufacture, whereas, the device of the present invention is very simple and economical to construct because it can be made of two-piece or less construction in comparison with the device of U.S. Pat. No. 2,892,284 which is of seven-piece construction or greater. Also the device of the present invention being of straightforward sturdy construction is less likely to have mechanical failures as would a device made of a multi-piece construction as in U.S. Pat. No. 2,892,284.

While it will be apparent that the preferred embodiments of the invention disclosed are well calculated to fulfill the objects above stated it will be appreciated that the invention is susceptible to modification, variation, and change without departing from the proper scope or fair meaning of the subjoined claims.

What is claimed is:

1. A fish hook remover comprising:
a two piece assembly, including
an L-shaped tubular member,
   a handle means at and formed by the lower end of the L-shaped member,
   a fork means at the other end of the L-shaped member,
an elongated wire member,
   a large U-shaped means at one end of the wire member with one side of the U-shaped means being lodged inside the end of the tubular handle means,
   a smaller U-shaped means at the other end of the wire member, with part of the wire between said two U-shaped means extending through said tubular member, said smaller U-shaped means being slidably arranged relative to said fork means to reduce the area defined within the fork when the two are slidably moved together,
   said large U-shaped means being operative to act as a spring for biasing the smaller U-shaped means back to a normal set position in between uses of the fish hook remover.

2. A fish hook remover comprising:
an L-shaped tubular member,
   a handle means at and formed by the lower end of the L-shaped member,
   a fork means at the other end of the L-shaped member,
an elongated wire member,
   a large U-shaped means at one end of the wire member,
   a smaller U-shaped means at the other end of the wire member,
      said smaller U-shaped means being slidably arranged relative to said fork means to reduce the area defined within the fork when the two are slidably moved together,
   said large U-shaped means being operative to act as a spring for biasing the smaller U-shaped means back to a normal set position in between uses of the fish hook remover.

3. A fish hook remover comprising:
a generally L-shaped guiding means,
   a handle means at and formed by one end of the L-shaped guiding means,
   a fork means at the other end of the L-shaped guiding means,
an elongated member means,
   a large U-shaped means at one end of the member means,
   a smaller U-shaped means at the other end of the member means,
      said smaller U-shaped means being slidably arranged relative to said fork means to reduce the area defined within the fork when the two are slidably moved together,
   said large U-shaped means being operative to act as a spring for biasing the smaller U-shaped means back to a normal set position in between uses of the fish hook remover.

4. The invention of claim 3 wherein,
said L-shaped portion is formed in part by spiral wire means at least partially enclosing a part of the elongated wire portion which extends out to the smaller U-shaped means.

5. The invention of claim 1 wherein,
said fish hook remover is of exactly two-piece construction,
said large U-shaped means has a multi-crimped end portion which is lodged inside the tubular handle,
said tubular member has a barrel portion with two apertures therein, and
said wire member has a portion thereof which passes in one of said two apertures and out the other.

* * * * *